Dec. 1, 1925.
G. H. SCHIEFERSTEIN
1,563,531
METHOD OF AND MEANS FOR BALANCING AND COUPLING FREELY OSCILLATING
UNITS AND UNITS WITH RESTRAINED OSCILLATIONS
Filed Nov. 13, 1924
3 Sheets-Sheet 1
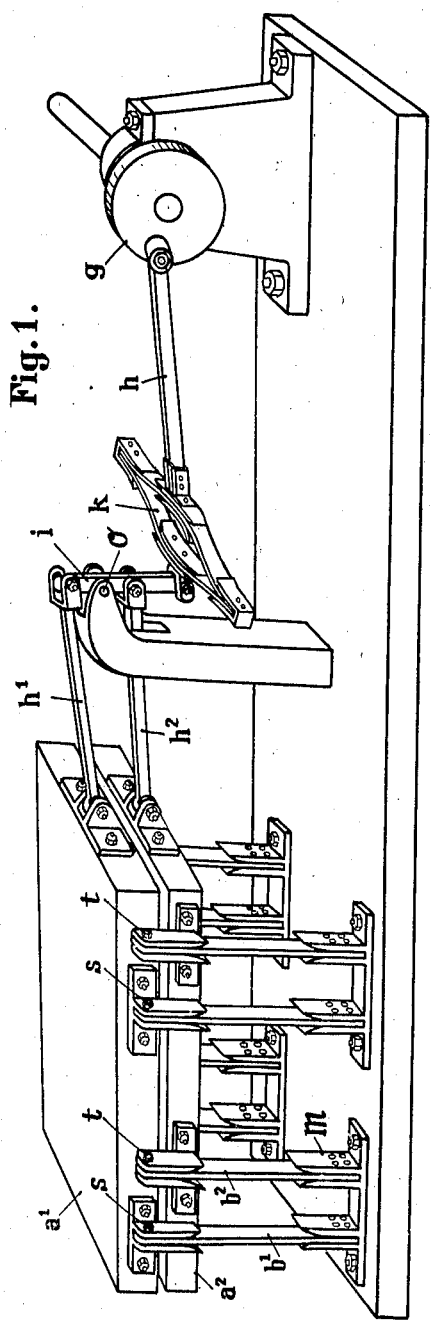
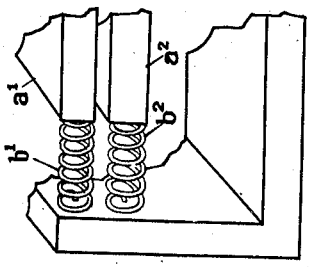
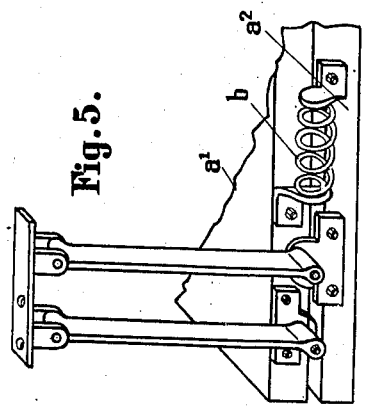
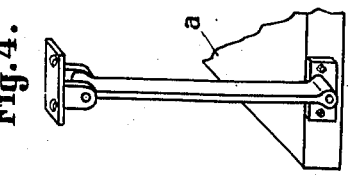
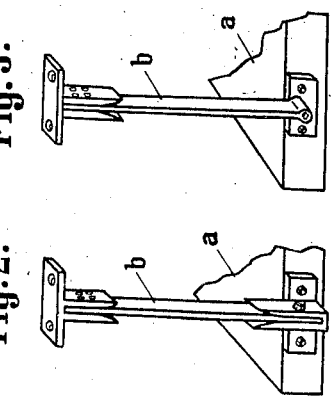
INVENTOR.
GEORG HEINRICH SCHIEFERSTEIN
BY
*Rudolf Wildermann*
ATTORNEY.

Dec. 1, 1925.
G. H. SCHIEFERSTEIN
1,563,531
METHOD OF AND MEANS FOR BALANCING AND COUPLING FREELY OSCILLATING
UNITS AND UNITS WITH RESTRAINED OSCILLATIONS
Filed Nov. 13, 1924    3 Sheets-Sheet 2

INVENTOR.
GEORG HEINRICH SCHIEFERSTEIN
BY
Rudolf Wildermann
ATTORNEY.

Dec. 1, 1925.  1,563,531
G. H. SCHIEFERSTEIN
METHOD OF AND MEANS FOR BALANCING AND COUPLING FREELY OSCILLATING
UNITS AND UNITS WITH RESTRAINED OSCILLATIONS
Filed Nov. 13, 1924  3 Sheets-Sheet 3
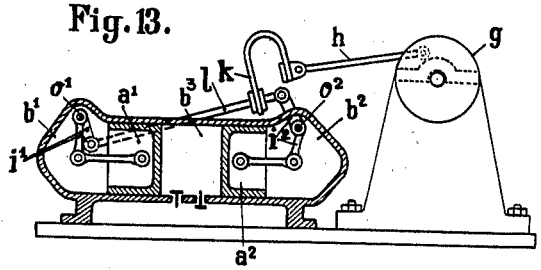
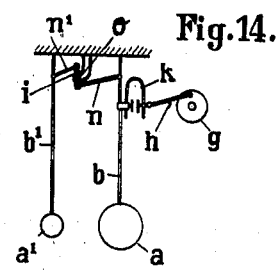
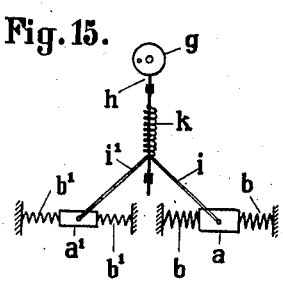
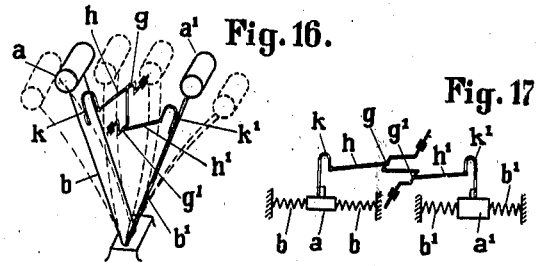
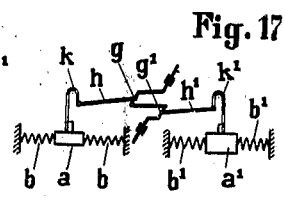
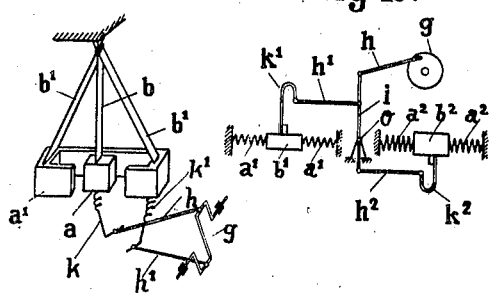
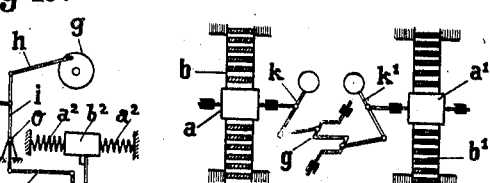
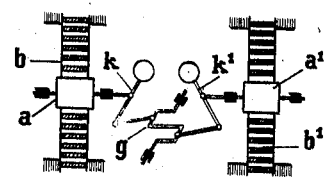
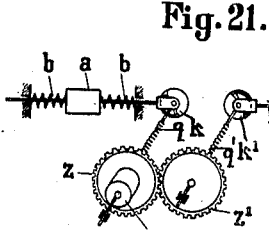
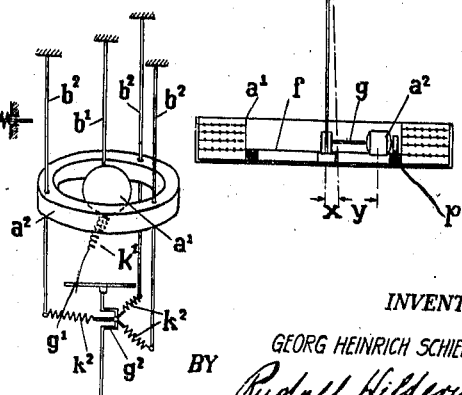
INVENTOR.
GEORG HEINRICH SCHIEFERSTEIN
BY Rudolf Hildermann
ATTORNEY.

Patented Dec. 1, 1925.

1,563,531

UNITED STATES PATENT OFFICE.

GEORG HEINRICH SCHIEFERSTEIN, OF BERLIN-CHARLOTTENBURG, GERMANY.

METHOD OF AND MEANS FOR BALANCING AND COUPLING FREELY-OSCILLATING UNITS AND UNITS WITH RESTRAINED OSCILLATIONS.

Application filed November 13, 1924. Serial No. 749,722.

*To all whom it may concern:*

Be it known that I, GEORG HEINRICH SCHIEFERSTEIN, residing at Berlin-Charlottenburg, Kaiser-Friedrich-Strasse 1, Germany, have invented certain new and useful Improvements in Methods of and Means for Balancing and Coupling Freely-Oscillating Units and Units with Restrained Oscillations (for which I have filed applications in Germany, Sept. 12, 1923; Germany, Aug. 26, 1924; Germany, Sept. 3, 1924; Great Britain, Sept. 10, 1924; and in France, Sept. 9, 1924), and of which the following is a specification.

This invention relates to a method of and means for compensating forces and inertia effects.

Devices serving to absorb or neutralize shocks produced by intentional or unintentional mechanical oscillations, are well known. One group of such devices is based on the damping of shocks occurring in foundations and other parts of constructions, in which case use is often made of resilient materials which, in giving way, transform the energy of the shock into heat. Other devices, liquid or gaseous media are allowed to flow through narrow nozzles or slits from one chamber into another, in which event the energy of the shock is taken up by throttling, and therefore also by transformation into heat. A third group of devices employ elastic means for eliminating the effects of vibration, in devices of this type success, in many—if not in all—instances is obtained only by continually exchanging the elastic parts against others of different characteristics until the desired effect is produced; or else, by taking into consideration the circumstance that rhythmic shocks excite an oscillating system in such a manner that the resulting external manifestation of forces is nullified. However, such a system may in the vicinity both of a displacement of 180° or of 0° between the phase of the oscillating system and the phase of said shocks adjust itself so as to be stationary in relation to the vibration to be overcome; that is to say a sudden change from one condition to the other may occur. Apart from the fact that an exact phase displacement of 180° is never attainable, and therefore no complete equilibrium can be obtained the extreme case has to be reckoned with that the phase angle adjusts itself or change over suddenly to 0°.

The subject of my invention is a "coupling device" which sets into opposite motion freely oscillating systems or parts of freely oscillating systems with a phase displacement of 180°, in such a manner that the forces of vibration are almost or completely absorbed. In this case, freely oscillating systems, working in opposition, may possess equal masses and equal amplitudes, or, on the other hand, their amplitudes may be in inverse ratio to their masses.

With this object in view the following methods are at my disposal:

1, to actuate the two opposed systems or masses by crank gearing, offset 180°, in combination with a loose coupling for each system; or 2, to cause a single crank-pin, connected by a single interposed loose coupling to actuate the oppositely acting systems or masses with a positive phase displacement of 180° by means of levers or other mechanical devices; or 3, to cause a single crank-pin, jointed to a two-arm lever and to two loose couplings, to set the opposed systems in oscillation— the oscillations having a phase displacement of 180°; or 4, to cause the source of energy itself to move in a phase displacement of 180° in relation to the operated system.

In all four systems, it is necessary, in order to obtain complete equalization of the masses, that—as already mentioned—the amplitude should be in inverse ratio to the masses moving in opposition. The partial use of one or the other means in cases where complete balancing is not required, does not affect my invention. Similarly, it is possible to arrange the driving portion as a positively oscillating system (crank) and the driven portion as a freely oscillating system. However, it is also feasible—as illustrated in the accompanying drawings and as hereinafter described—to arrange the driving portion as a freely oscillating system, for example a gas-engine, and the driven portion as an elastically coupled arbitrarily oscillating system (crank). It is also possible to employ, in place of the elastic coupling usually specified, any other type of coupling, which falls into the class of "yieldable" couplings in analogy to loose couplings in high frequency electrical circuits.

In order to understand more clearly the invention, reference is made to the accompanying drawings, in which masses are denoted by "$a$", elastic means by "$b$", means for loose coupling by "$k$", crank-pins, or similar parts by "$g$", and crank rods and the like by "$h$".

Fig. 1 represents a view of the preferred construction of the mechanism in question.

Figs. 2–13 show in view alternative constructions of parts of said mechanisms in question.

Figs. 14–23 show diagrammatically constructions where the principle of the invention is used.

Figure 7:
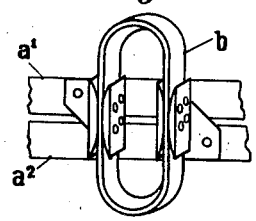

Fig. 1 represents an embodiment in which two masses $a^1$ and $a^2$ are supported by four elastic means $b^1$ and $b^2$ respectively. The mass $a^1$ with the elastic means $b^1$ and the mass $a^2$ with the elastic means $b^2$ each forms an energy accumulating oscillating system which has a definite natural frequency. By selecting, dimensioning or adjusting the elastic means in relation to the the masses, the two oscillatory systems are tuned to the same or approximately the same frequency. According to my invention the process of oscillation of these two oscillatory systems takes place in such a way that their directions of movement are opposed at any given moment, this object being accomplished by means of a lever $i$, hinged on pivot $o$ which is connected with the mass $a^2$ by means of the connecting rod $h^2$. This lever $i$ therefore causes the two oscillatory systems ($a^1$ $b^1$) and ($a^2$ $b^2$) to oscillate with a phase displacement of 180°. Both systems are, nevertheless, capable of oscillating freely, since both are connected with the driving crank gearing $g$, by way of the crank rod $h$ through an elastic yieldable coupling $k$.

If the point of attachment of the two springs in each of the two systems moving in opposite direction be so arranged that the ideal point of application of all springs lies in a common plane $s\,t\,s\,t$ and at a common base as shown in Fig. 1, then the oscillation will not transmit any vibrations or forces to the common base plate or any other externally located machine parts. The springs made of flat steel, may be secured between plates, in which case they will exhibit a dangerous section at the spot where the holding member terminates. If, on the other hand, extended holding members $m$ are used, and the surfaces of said members, facing the flat springs are shaped to the curvatures of springs of equal strength or of an over-dimensioned spring, the result will be that the stresses set up in the bent springs within the area covered by these holding members are as great as in springs of equal strength or over-dimensioned springs. In this way it is possible to distribute the stress over the whole length of any given flat spring in any manner desired. It is only required to give a corresponding shape to those surfaces of the holding members which face the springs. In the present case it is sufficient for the springs of the freely oscillating system to be held, in the decribed manner, for merely a short distance, at the clamping point by holding members $m$. In the construction of the elastic coupling device $k$ holding members of the above-described type are also used. The whole arrangement operates in the following manner:

The crank gearing $g$ is set in motion, and by reciprocating, stresses the coupling device $k$ alternately in opposite directions. These stresses are transmitted to the lever $i$ and through the two rods $h^1$ and $h^2$ to the oscillatory systems ($a^1$ $b^1$) and ($a^2$ $b^2$) respectively, which move at a phase displacement of 180°. The initial amplitude is very small and then the amplitude continually increases. At the moment they are in tune the amplitude of the described systems has attained its maximum value, and, at this moment, the transmission of energy and the useful effect reach also both a maximum value.

This unit can be proportioned as a result of calculations or experiments in such a way that no propagation of any kind of vibrations takes place. It is therefore suitable for the screens of mills and threshing machines, for the preparing or cleaning of coal and ore, and also, generally for prime movers machines and other appliances.

As illustrated in Fig. 2, the masses $a$ may also be suspended from the elastic means $b$. Again, as shown in Fig. 3, the elastic means $b$ may take the form of springs clamped at one end only. The other end is hinged.

Moreover, according to Fig. 4, the mass $a$ may have pendular suspension by a joint which is hinged at both ends. In this case the elasticity is replaced by gravity.

Figure 8:
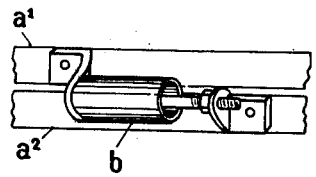

Elasticity may be added to the force of gravity. For this purpose an elastic means $b$ (such as a spiral spring) may be arranged between the masses $a^1$ and $a^2$ themselves as illustrated in Fig. 5. This elasticity may be produced by a fully closed flat spring (as in Fig. 7) or by a pneumatic cylinder and plunger (as in Fig. 8).

The masses $a^1$ and $a^2$ can also be supported by elastic members $b^1$ and $b^2$ in fixed points, as shown in Fig. 6.

Figure 9:
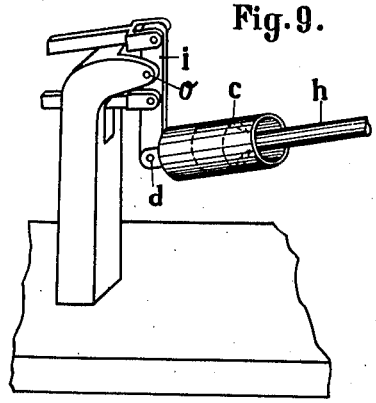

Whereas, as previously stated, the coupling shown in Fig. 1 consists of an elastic coupling of leaf springs, which may also be clamped between chamfered clips, other types of coupling may also be used, for example:

Fig. 9 shows an elastic coupling in which an air-cushion furnishes elasticity. The one end of the connecting rod $h$ is a plunger sliding in a cylinder $c$, which engages the lever $i$ at the point $d$.

Figure 10:
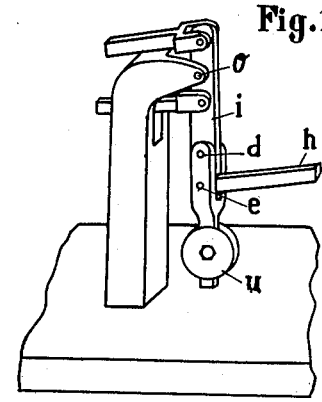

Fig. 10 is a typical representation of an inertia coupling, consisting of a mass $u$ which is movably and adjustable suspended on the reversing lever $i$ at the point $d$ and engages the connecting rod $h$ at the point $e$.

Figure 11:
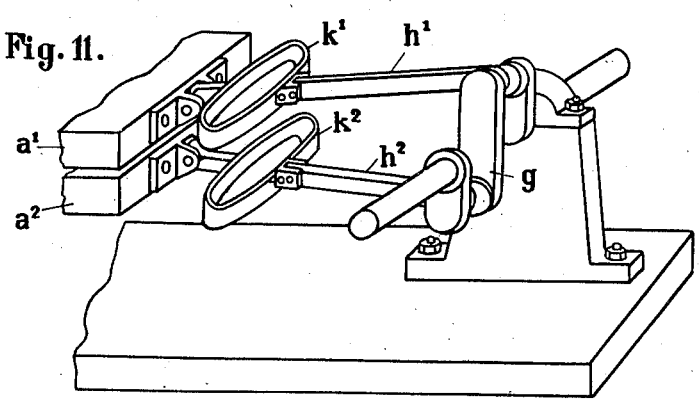

Fig. 11 shows the method of operating each of the oscillating systems by a separate coupling $k^1$ and $k^2$. These couplings are hinged to the masses $a^1$ and $a^2$ respectively, and are driven from the double crank shaft $g$ by means of the connecting rods $h^1$ and $h^2$.

Figure 12:
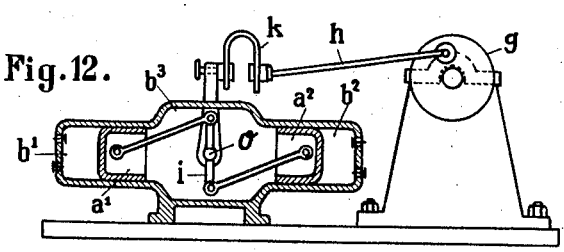

Fig. 12 shows the application of my invention to an internal combustion engine. The pistons $a^1$ and $a^2$ form the oscillating masses, which are operated in opposite directions by the lever $i$. In this case the elastic means $b^1$ and $b^2$ is furnished by the gas cushions of the two explosion chambers, and of the compression cylinder $b^3$, which is common to both pistons. The energy is transmitted to the outside through shaft $o$ in lever $i$, and by the coupling $k$ to the crank drive $(g\ h)$.

The arrangement illustrated in Fig. 13 differs from that of Fig. 12 in that the explosion chamber $b^3$ is common to both pistons and the cylinders $b^1$ and $b^2$ are arranged as compression cylinders. The two pistons $a^1$ and $a^2$ act on two levers $i^1$ and $i^2$, one of which $i^1$ is arranged as reversing lever, the two levers being jointed to a connecting rod $l$ from which the energy is transmitted through the coupling member $k$ to the crank gear $(g\ h)$.

Fig. 14 shows a mass $a$ suspended from the pendular rod $b$ jointed to the crank drive $(g\ h)$ by a coupling member $k$. When the crank drive $g\ h$ revolves, the coupling member $k$ is stressed and compressed alternately in opposite directions, thereby keeping the pendulum in motion. The second pendulum $(a^1\ b^1)$ has the same frequency. The two pendulum rods $b$ and $b^1$ are hinged by the joints $n$ and $n^1$ respectively to the lever $i$ which is pivoted in $o$. When the pendulum bob $a$ swings toward the right the pendulum bob $a^1$ will swing towards the left, and vice versa. The horizontal components of the pendulum bobs $a$ and $a^1$ as well as of their reactions obviously equalize each other at the level of the points of suspension of the pendula, provided the two bobs $a$ and $a^1$ have an equal amplitude of oscillation and mass. The two pendulum bobs may be of different weight. Then it must be considered that the lever-arms are lengthened or shortened in inverse ratio, so as to increase the amplitude of oscillation of the smaller bob and lessen that of the larger one. In this case the horizontal components are also completely equalized.

In Fig. 15 the oscillating systems $(b\ a\ b)$ and $(b^1\ a^1\ b^1)$ are connected directly by joints $i$ and $i^1$ and should have the same frequency. Here again a crank gearing $(g\ h)$ alternately stresses and compresses the coupling member $k$ in opposite directions, and thus causes the oscillating masses $a$ and $a^1$ to move in opposite directions.

Fig. 16 shows an arrangement of oscillating systems with two coupling members $k$ and $k^1$, as before. The forces set up in opposing direction neutralize each other completely.

If it is desirable not to connect the masses by direct joints compensation may be obtained by driving two oscillating systems $(a\ b)$ and $(a^1\ b^1)$ (Fig. 17), by means of the connecting rods $h$ and $h^1$ and to insert two coupling members $k$ and $k^1$ and to use two crank-pins $g$ and $g^1$ at 180°. In this case, the oscillating systems must be absolutely in tune.

In Fig. 18 the two oscillating systems $a\ b$ and $a^1\ b^1$ are arranged one within the other.

Fig. 19 corresponds to Fig. 17 but in this case there is a single drive from the single gear $(g\ h)$ by a lever $i$, reversing the direction of movement. The couplings $k^1$ and $k^2$ are inserted between the lever and the two oscillating masses.

Fig. 20 shows two systems oscillating in the same horizontal plane. They comprise the masses $a$ and $a^1$ and the elastic means $b$ and $b^1$ and are driven by the double crank gearing $g$ with pins at 180°. Two "inertia couplings" $k$ and $k^1$ are shown in this case which may be used, in substitution of any "elastic coupling."

Fig. 21 shows a modification of the two systems $(b\ a\ b)$ and $(b^1\ a^1\ b^1)$. They oscillate in the same horizontal plane and are actuated by the inertia (mass) couplings $k$ and $k^1$. These are held at a phase displacement of 180° as the two meshed gears $z$ and $z^1$ which are driving them through flexible shafts $q$ and $q^1$, turn in opposite directions and have the same number of teeth. The belt pulley $r$ furnishes the drive.

The foregoing description illustrates the compensation of forces in oscillating systems in the same horizontal plane.

Fig. 22 illustrates a method of applying this compensation to a circularly oscillating set. $a^1$ is the mass and $b^1$ the elastic means of a system which moves in circular oscillation. A second circular oscillation set is arranged around said first set. It has an annular mass $a^2$ and the elastic means $b^2$, $b^2$ and $b^2$. The excitation of these two sets is in the same direction of rotation but with a phase displacement of 180°. This excitation is effected by the coupling member $k^1$ engaging the mass $a^1$ and the coupling members $k^2$, $k^2$, $k^2$ engaging the mass $a^2$. The phase displacement between the two sets remains constant as the three coupling members $k^2$, $k^2$, $k^2$ are actuated by the crank pin $g^2$ and the coupling member $k^1$ by the crank disc $g^1$ and as $g^1$ and $g^2$ are fixed parts of a crank gearing and are 180° apart. On these two circularly oscillating sets the horizontal component are also fully compensated, if the masses $a^1$ and $a^2$ have equal amplitude and weight, or if, in the case of unequal weights, their amplitudes of oscillation are inversely proportional to their weights.

Fig 23 illustrates a typical circular or tumbling oscillating set, in which inertia effects are equalized and which therefore does not propagate vibrations to the outside. In this case the mass $a^1$ is symmetrically mounted on the pendulum rod $b^1$. The mass $a^2$ consists of an electric-motor attached to the crank $g$ which travels around the pendulum rod $b^1$, its belt pulley $p$ rolling along an annular track $f$ of the mass $a^1$. The speed of the motor is adjusted so that the number of its turns about the pendulum rod $b^1$ is in tune with the natural frequency of the circularly oscillating system ($a^1\, b^1$). Therefore as a matter of course the ratio of the mass $a^1$ to its amplitude $x$ is equal to the ratio of the amplitude $y$ to the mass $a^2$. And the driving motor $a^2$ which is inertia-coupled to the mass $a^1$ through the crank $g$, tends to remain in a phase displacement of approximately 180° in relation to the mass $a^1$, since it thus always finds itself at the lowest point of the track which is inclined on account of the oscillation of the system ($a^1\, b^1$). If the mass $a^2$ acting as a source of energy, were sliding in an additional fixed track, the crank $g$ would be superfluous.

Circular or oscillatory movements can be used outside of their natural frequency, to do work. But the highest efficiency is obtained when the two oscillatory systems are in tune.

Claims:

1. In a device of the character described, in combination, one oscillating unit, a pair of naturally oscillating units, a positive, operative reversing connection between said pair of naturally oscillating units, and a yieldable coupling between said one oscillating unit and said connection.

2. In a device of the character described, in combination, one oscillating unit, a pair of naturally oscillating units, the masses of which are arranged to be inversely proportional to their amplitudes, an operative reversing connection between said pair of naturally oscillating units, and a yieldable coupling between said one oscillating unit and said pair of naturally oscillating units.

3. In a device of the character described, in combination, one oscillating unit, a pair of naturally oscillating units, supported by levers in which all points of equal amplitudes are located in parallel planes, an operative reversing connection between said pair of naturally oscillating units, and a yieldable coupling between said one oscillating unit and said pair of naturally oscillating units.

4. In a device of the character described, in combination, one oscillating unit, a pair of naturally oscillating units supported by tensile members in which all points subject to equal amplitudes and stresses are located in parallel planes, an operative reversing connection between said pair of naturally oscillating units, and a yieldable coupling between said one oscillating unit and said pair of naturally oscillating units.

5. In a device of the character described, in combination, one oscillating unit, a pair of naturally oscillating units the masses of which are inversely proportional to their amplitudes and which are supported by tensile members in which all points subject to equal amplitudes and stresses are located in parallel planes, an operative reversing connection between said pair of naturally oscillating units, and a yieldable coupling between said one oscillating unit and said pair of naturally oscillating units.

6. In a device of the character described, in combination, one oscillating unit, a pair of naturally oscillating units, one oscillating unit operated to oscillate at a frequency synchronous to the natural frequency of said pair of oscillating units, an operative reversing connection between said pair of naturally oscillating units, and a yieldable coupling between said pair of naturally oscillating units and said one oscillating unit.

7. In a device of the character described, in combination, one oscillating unit, a pair of naturally oscillating units supported by tensile members, the ends of said members being mounted in forked sockets, the faces of which are curved proportionate to the deflections of said tensile members, an operative reversing connection between said pair of naturally oscillating units, and a yieldable coupling between said one oscillating unit and said pair of naturally oscillating units.

8. In a device of the character described, in combination, one oscillating unit, a pair of naturally oscillating units supported by tensile members, those of said tensile members, which are correspondingly located on said oscillating units, having common mountings, respectively, at one end, an operative reversing connection between said pair of naturally oscillating units, and a yieldable coupling between said one oscillating unit and said pair of naturally oscillating units.

GEORG HEINRICH SCHIEFERSTEIN.